July 9, 1935.  M. H. LEMAIRE  2,007,400
APPARATUS FOR THE LEVELING OF RAILWAYS
Original Filed Dec. 13, 1923   2 Sheets-Sheet 1
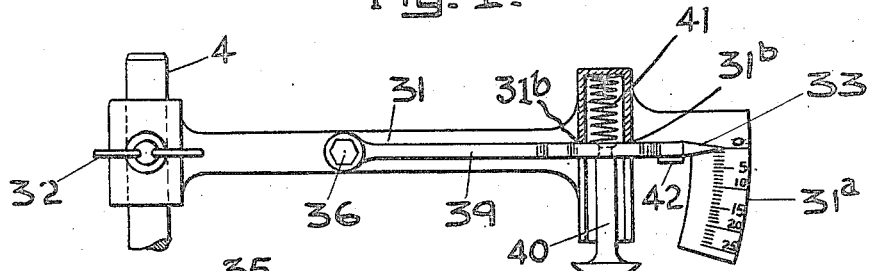
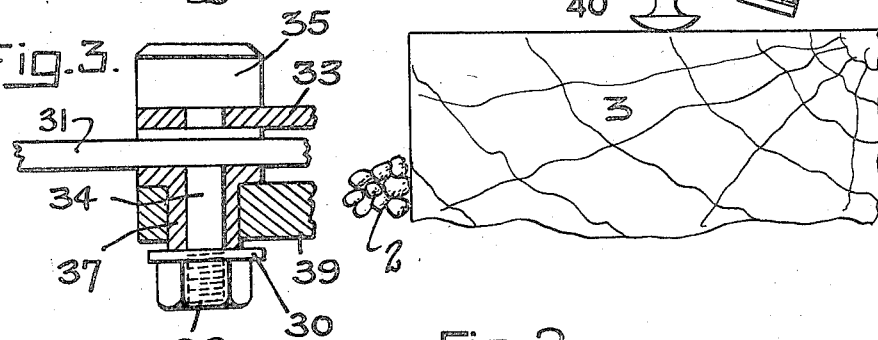
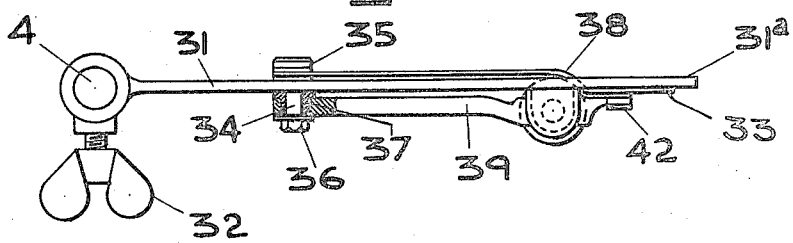
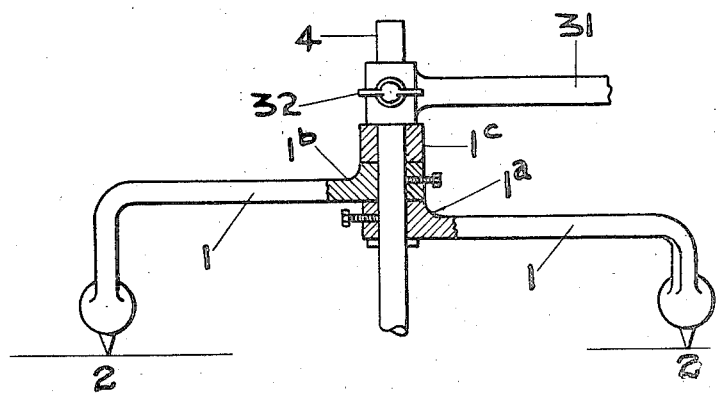
INVENTOR
MAURICE HENRI LEMAIRE
BY *Haseltine, Lake & Co.*
ATTORNEYS

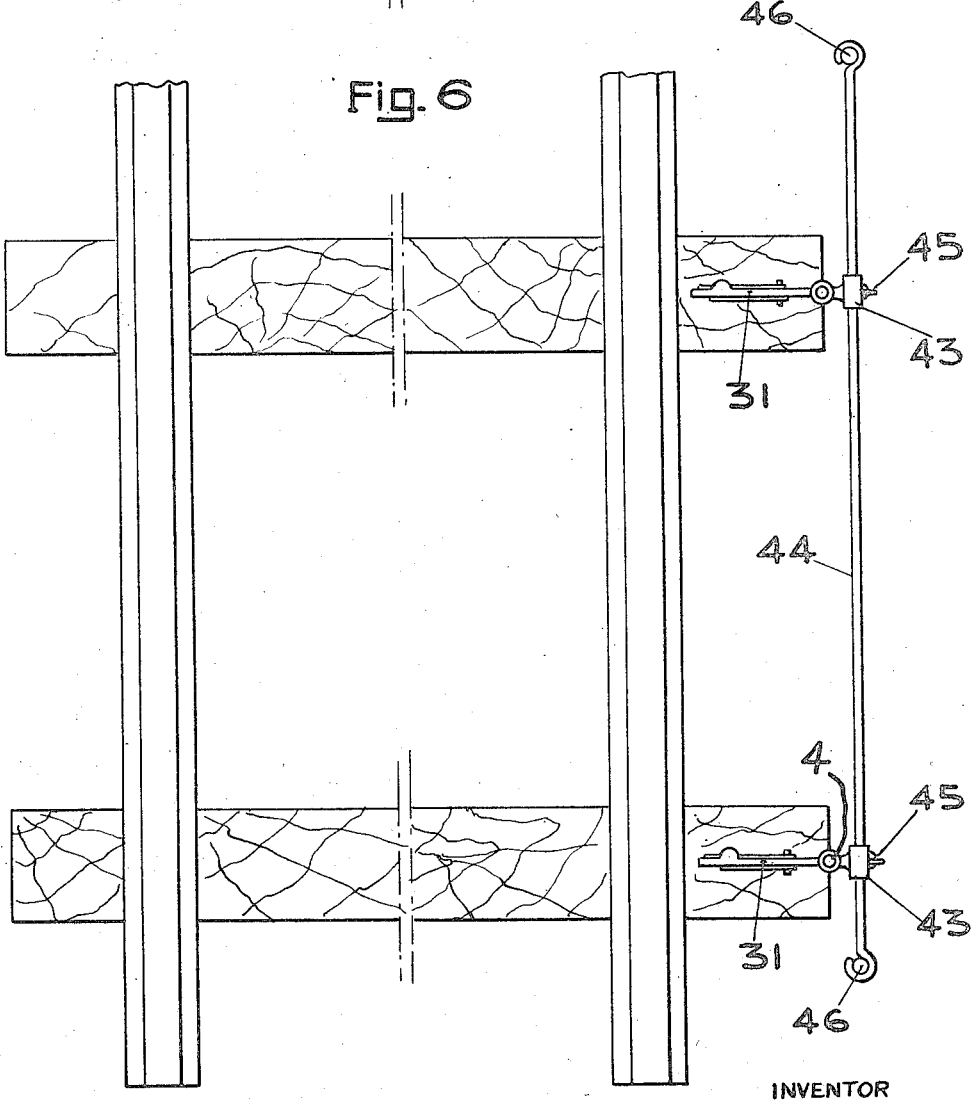

Patented July 9, 1935

2,007,400

UNITED STATES PATENT OFFICE 2,007,400

APPARATUS FOR THE LEVELING OF RAILWAYS

Maurice Henri Lemaire, Ermont, France

Original application December 13, 1928, Serial No. 325,838. Divided and this application August 23, 1932, Serial No. 630,041. In France December 13, 1927

2 Claims. (Cl. 33—172)

This application forms a division of application Serial Number 325,838, filed December 13, 1928, now Patent No. 1,922,895 of August 15, 1933.

It is known that it is periodically necessary, for the upkeep of railways, to raise the support of certain series of sleepers in order to obtain a suitable leveling of the track.

The methods at present employed for evaluating the raising necessary are purely empirical because means are not available which will permit of determining with the desirable approximation; the height to which it is convenient to raise each sleeper.

The present invention relates to a measuring apparatus which permits of determining, with exactitude, the drop of certain sleepers when a loaded axle passes over them. This determination which is obtained very easily, permits the staff in charge of the leveling of the track to determine the quantity of ballast or gravel which must be introduced under each sleeper.

For this purpose, according to the present invention, an apparatus is used (hereinafter termed a "dansometer") which serves to measure the amount by which a sleeper drops when a train passes over it.

This appliance is shown by way of example in one of the constructional forms, which is a particularly simple one in the accompanying drawings in which:

Fig. 1 is a view in sectional elevation of the "dansometer" device which is provided with a segment.

Fig. 2 is a view in plan of the same device.

Fig. 3 is an enlarged fragmentary view partly in section of a portion of Fig. 2, showing the details of the mounting of the index arm of said view.

Fig. 4 is a view of a foldable tripod shown partly in section to indicate the construction.

Figs. 5 and 6 illustrate, in elevation and plan view, an arrangement allowing simultaneous measurement of the drop of a series of sleepers.

In principle, as shown in Figures 1 to 6, the apparatus termed the "dansometer" is composed substantially of a fixed portion resting on the ballast and of a movable portion which accompanies the movements of the sleeper. The maximum amplitude of these movements relative to the position of rest of the sleeper is measured by the aid of a maximum index which moves in front of an element of a fixed portion of the apparatus bearing directly on the ground.

In the example considered, the fixed part of the "dansometer" may, for example, primarily include a stand consisting of two or more legs 1, 1 resting on the ground or on the ballast of the road bed, said stand being astride any of the sleepers 3 such as shown in Fig. 1, but not touching the same.

More specifically, the dansometer device includes an arm 31 capable of horizontally rotating about a vertical rod 4 on which it is locked by a wing nut 32.

The arm has a graduated segment or scale sector 31$^a$ in front of which an index 33 moves. This index pivots, with some friction, about an axle 34. This friction is adjustable and the axle 34 (Figs. 2 and 3) carries for that purpose a head 35 which fits with more or less force on the index 33 according as a nut 36 is more or less tightened, this nut being screwed on the end of the axle 34 and by means of a washer 30 pressing against a bearing piece 37 introduced on the axle 34.

The index 33 which is arranged on the rear face of the arm 31 is curved in the region 38, so that its free end is located on the front face of the arm for moving in front of the dial 31$^a$.

About the bearing piece 37 can pivot with slight friction, a lever 39 having a tenon 40 the lower end of which is placed on the upper portion of a sleeper 3; this lever is on the other hand, subjected to the action of a spring 41 bearing on the arm 31 and acting on the same in such a direction that the tenon 40 is held constantly pressed on the sleeper 3.

An abutment 42, carried by the index 33, is fitted underneath the lever.

The apparatus, when at rest, is so arranged that the lever 39 abuts against the walls 31$^b$ of the housing for the spring 41, and the index is brought back to zero, the abutment or lug member 42 being in contact with the lever 39.

The apparatus ready to operate is illustrated in Fig. 1.

Upon passage of a train over the sleeper, the latter drops, the tenon or contact member 40 follows it in its displacement, under the action of the spring 41; the lever 39 then drives the abutment member or lug 42 and causes the angular displacement of the index 33, which remains in its position of maximum separation, owing to the friction which is exerted on its axis of rotation.

Figs. 5 and 6 illustrate an arrangement which can be adapted for simultaneously measuring the maximum drops of a series of sleepers. For that purpose, a plurality of the rods 4 are held by slides 43 arranged and locked on a bar 44 by wing screws 45, slides 43 being slidable on the bar 44 which is supported between two stakes 46 driven in the ballast.

The rod or upright 4 can be supported by a stand or any other means desired. For diminishing the cumbersomeness of this support, its three legs lead respectively (Fig. 4) to the superposed rings, 1ª, 1ᵇ, 1ᶜ, in which is introduced the rod 4. A locking device may be adjoined to these legs. For folding up the apparatus, it suffices to cause the legs to rotate about the rod 4 so as to bring them in the same half-plane.

The graduation of the segment or scale sector 31ª indicating the maximum drops of the sleepers is traced by taking into consideration the relation existing between the respective distances from the tenon 40 and point of the index 33 to the axis of rotation 34.

It will be understood that by increasing the length of the index 33 without increasing the length of the lever 39, it is possible to increase the indications of the displacements of the point of the index for one and the same drop of the sleeper. The accuracy of the apparatus can therefore be increased by this method.

Manifestly, variations of my invention may be resorted to, and parts may be used without others.

Having now fully described my invention, I claim:

1. A gauge for measuring the momentary drop or sinking of a railroad tie under the load of a passing train, comprising an upright adapted to be fastened on the ballast bed so as to stand in a fixed vertical position next to the tie to be observed, a rigid horizontal arm adjustably secured on said upright in height and orientation, a vertical cylinder carried by said arm, a normally horizontal oscillatable lever pivoted on said arm and carrying a contact member adapted to rest on the upper surface of the tie to be observed, a spring working in said vertical cylinder, and acting on said lever so as to maintain said contact member in permanent abutting relation with the upper surface of the tie to be observed during the passage of a train over said tie, an index member associated with said rigid arm, a pivotal mounting simultaneously holding said index member frictionally against said arm and providing a pivot upon which the index member may swing, means providing separable interconnection between said index member and said lever by contact so that the index member is in abutting relation with the under side of the lever, whereby to follow the downward oscillation of the same occurring during the passage of a train and to be frictionally retained in attained position against return to the initial position by the effect of said frictional mounting during return oscillation of said lever which occurs after said passage, and a graduated sector carried by said arm and having its zero positioned for register of the point of said index member when the latter is in its normal abutting position in order to facilitate the reading of the maximum angular displacement of said index member with respect to the fixed horizontal arm thus obtained.

2. A gauge for measuring the momentary drop or sinking of a railroad tie under the load of a passing train, comprising an upright adapted to be fastened on the ballast bed so as to stand in a fixed vertical position adjacent to the tie to be observed, a rigid horizontal arm adjustably secured on said upright in height and orientation, a shaft extending through said rigid horizontal arm from one side to the other thereof, a normally horizontal lever mounted upon one end of said shaft upon the one side of said rigid horizontal arm so as to be capable of oscillation, a contact piece carried by said lever adapted to rest on the upper surface of the tie to be observed, a spring acting on said lever so as to maintain said contact piece in permanent abutting relation with the upper surface of the tie to be observed during the passage of a train over said tie, an index mounted upon the other end of said shaft upon the other side of said rigid horizontal arm, which shaft has a portion frictionally holding said index against rigid horizontal arm, means providing separable interconnection between said lever and index by contact of said lever with said index in initial zero position of both with respect to said rigid arm and cooperating with the frictional mounting of the index so as to cause said index to follow the downward oscillation of the lever occurring during the passage of a train and be frictionally retained immobile in resulting attained position against return to initial position by the effect of said frictional mounting during the upward return oscillation of said lever which occurs after said passage of the train, and a graduated sector carried by said rigid horizontal arm adjacent to one portion of said index in order to facilitate reading of the maximum angular displacement of said index with respect to the rigid horizontal arm thus obtained.

MAURICE HENRI LEMAIRE.